United States Patent [19]

Shi

[11] Patent Number: 5,443,148
[45] Date of Patent: Aug. 22, 1995

[54] COASTING DEVICE FOR A VEHICLE

[76] Inventor: Qiwen Shi, No. 176, Dabeijie, Tangyin, Henan, China

[21] Appl. No.: 114,850

[22] Filed: Sep. 2, 1993

[30] Foreign Application Priority Data

Nov. 30, 1992 [CN] China .............................. 92240879.3
Feb. 18, 1993 [CN] China .............................. 93101939.7

[51] Int. Cl.⁶ .......................................... F16D 27/08
[52] U.S. Cl. .................................. 192/48.2; 192/43; 192/50; 192/51
[58] Field of Search ............... 192/48.2, 43, 50, 51

[56] References Cited

U.S. PATENT DOCUMENTS

| 834,574 | 10/1906 | Haynes | 192/50 |
| 849,474 | 4/1907 | Hedgeland | 192/50 X |
| 910,456 | 1/1909 | Brush | 192/50 |
| 1,254,540 | 1/1918 | Ruden | 74/650 |
| 4,278,156 | 7/1981 | Yano et al. | 192/51 X |
| 4,400,996 | 8/1983 | Schou | 74/650 |
| 4,433,766 | 2/1984 | Teraoka | 192/50 |
| 4,735,108 | 4/1988 | Teraoka et al. | 192/50 X |
| 4,782,720 | 11/1988 | Teraoka et al. | 192/50 X |

FOREIGN PATENT DOCUMENTS

| 92220827.1 | 6/1993 | China . | |
| 165280 | 8/1920 | United Kingdom | 192/50 |

Primary Examiner—Andrea L. Pitts
Attorney, Agent, or Firm—William F. Pinsak

[57] ABSTRACT

The present invention is a type of coasting device for a vehicle provided between a half shaft and a drive hub with external threads. A forward running ring and a rearward running ring, each with a truncated conical shaped surface, are mounted on the threaded section of the drive hub. An outer casing is coaxially provided at the outer circumference of the drive hub, the internal tapered surfaces of the casting matching the external truncated conical shaped surfaces of the two rings to form an overrunning clutch and a self-locking device. Thus, the inertial energy of vehicles can be sufficiently utilized, the release of harmful emissions from engines reduced, the wear of machine parts decreased and the driver's labor eased.

2 Claims, 2 Drawing Sheets

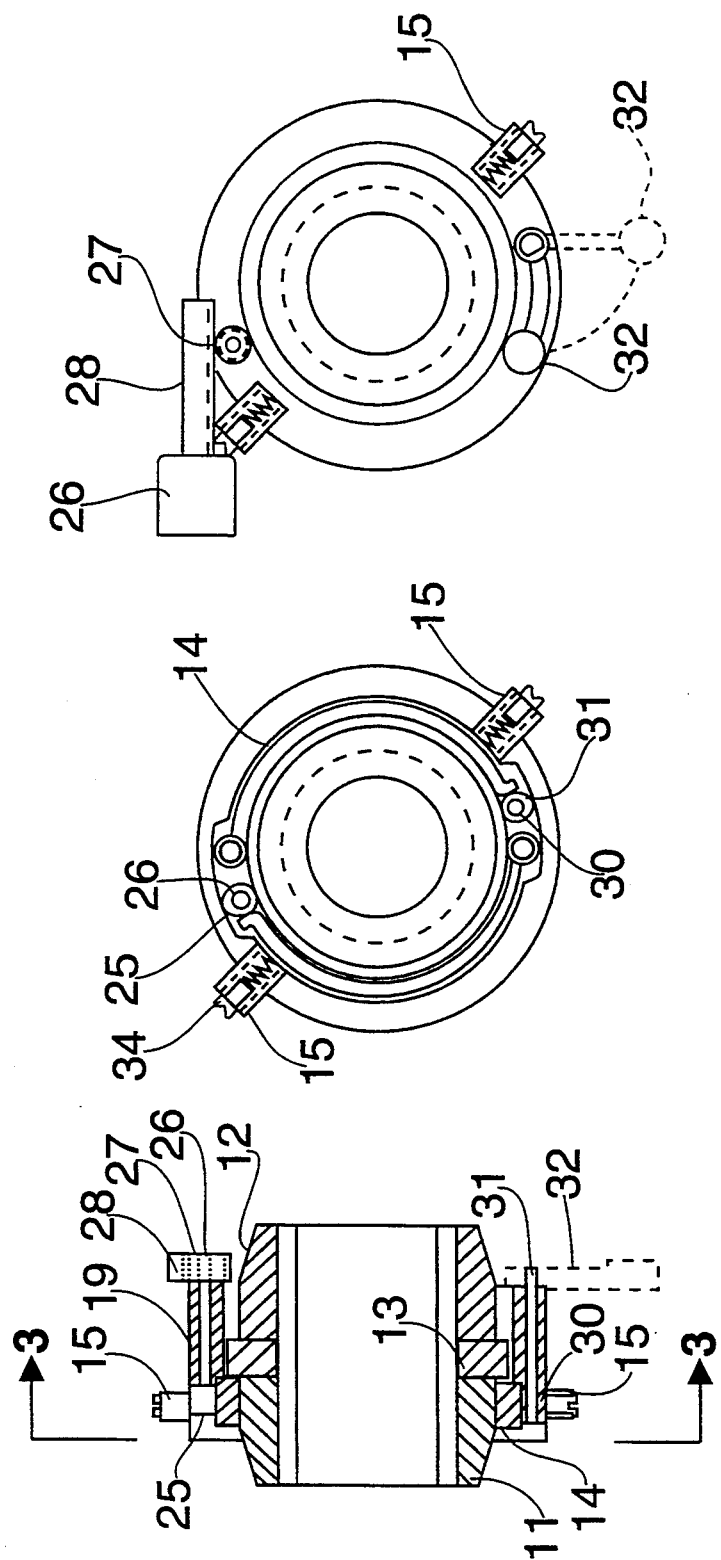

COASTING DEVICE FOR A VEHICLE

BACKGROUND OF THE INVENTION

The present invention relates to a type of coasting device for a vehicle used to accomplish a relative rotating or free running between a driving wheel and a half shaft.

Undoubtedly, it is a much desired way for saving fuel to coast forward by inertia when a vehicle travels at a certain speed. However, automotive drive is generally a constant-engaging one at present. Therefore, when the rotation speed of the half shaft is lower than that of the drive wheel, not only is the coasting resistance of the vehicle increased, but also the engine is activated inversely to rotate idly with high speed, thus making the inertial energy of the vehicle unable to be utilized completely and ultimately increasing the wearing of operating parts.

The applicant filed an application for a patent for utility model entitled "A Coasting Device With Double Cone-Surfaces Clutch for Vehicle" on Sep. 22, 1992, in The People's Republic of China. The application resulted in the grant of a patent right on Jun. 26, 1993, (Patent No. ZL92220827.1) which patent is cited here as a reference.

The cited patent disclosed a type of coasting device with a clutch having double conical-shaped surfaces for a vehicle, which accomplished overrunning clutching by the coasting device, which device comprised a forward truncated cone-shaped surface for forward running and a second truncated cone-shaped surface for rearward running.

However, by further experimentation and research, it has been determined that the invention of the cited patent has certain defects. For example, the reacting speed of the device of the coasting device is slow and its internal and external gears, which are used as a locking device, are subject to such stress that they can be broken. While overrunning clutching, collisions between the conical surface for rearward running and its matched rear conicalshaped surface can occur since the double conical-shaped surfaces are formed as an integral part. This results in a disturbance in the coasting, which has a negative effect to the coasting, even to the extent that the vehicle may be unable to travel normally. Furthermore, it is a relatively complex structure.

SUMMARY OF THE INVENTION

The present invention discloses an improved type of coasting device for a vehicle. The object of the present invention is to make the half shaft and the drive hub separate automatically to accomplish coasting by means of the coasting device when the rotational speed of the vehicle is lower than that of the drive hub. The drive hub will be engaged with the outer casing automatically by means of the coasting device so as to transmit the power from the half shaft to the outer casing through the drive hub when the rotational speed of the half shaft is greater than that of the drive hub.

The vehicle coasting device of the present invention comprises: a half shaft; a drive hub with an external thread coaxially provided outside of the half shaft; an overrunning clutch having a forward running ring and a rearward running ring, both matched with the external thread of the drive hub and having a truncated conical, or frustum, shape with tapered conical-shaped surfaces, and the tapered conical-shaped surfaces of the rings are oppositely disposed, and the rings are threaded onto the threaded section of the drive hub; a retainer ring provided between the two running rings; an outer casing coaxially provided outside of the drive hub with an annular chamber formed inside the casing, the chamber being provided with internal conical surfaces to match the conical surfaces of the two rings; said device also including a locking device provided outside the rearward running ring.

From the above description, in conjunction with FIG. 3, it will be obvious that the opposing running rings of the central cylindrical portion of the vehicle coasting device have their outer rims in the shape of a truncated cone, or, frustum. Corresponding components of the assembly assume the same surface in reverse. In order to simplify the explanation of the structure, and not by way of limitation, these surfaces will hereinafter be merely referred to as "tapered".

The outer casing comprises a first and a second cylinder, both having internal tapered surfaces, and being rigidly connected with a middle cylinder, forming an internal chamber with a cylindrical shape in the middle, tapered (as explained above) at both ends. When the half shaft is rotated by the engine, the drive hub rigidly connected with the half shaft will be rotated; the forward running ring, which matches the external thread on the drive hub, will approach the internal tapered surface of the second cylinder until it locks up with such internal tapered surface so as to transfer the power to the outer casing; and the vehicle wheels attached to the outer casing will be rotated together. When the rotational speed of the engine is decelerated, that of the half shaft will also be decelerated, but the vehicle wheels will continue to run forward by the force of inertia. The forward running ring will be rotated back to approach the retainer ring along the thread to accomplish separation from the internal tapered surface of the second cylinder of the outer casing and thereby achieve a coasting condition.

The locking device comprises a pair of brake shoes provided with externally mounted compression springs. The locking device is provided outside the rearward running ring to make the brake shoes grasp the rearward running ring. Provided at the shoe tip of one brake shoe is a cam mechanism, in which the cam can be rotated by an electro-magnetic device to release or lockup the brake shoe. Provided at the shoe tip of the other brake shoe is another, different, cam mechanism, in which the cam can be rotated by a centrifugal weight device to release or lockup the other brake shoe.

BRIEF DESCRIPTION OF THE DRAWINGS

The present invention is illustrated hereinafter by a detailed description of the preferred embodiment, which is presented in conjunction with, and by reference to, the accompanying drawings, in which like reference characters refer to like or corresponding parts, and wherein:

FIG. 2 is a schematic elevational view of the locking device; FIG. 2;

FIG. 3 is a schematic cross-sectional view along line 3—3 of FIG. 2;

FIG. 4 is a schematic view of the right side of the device in FIG. 2.

DETAILED DESCRIPTION OF THE PREFERRED EMBODIMENT

Figure 1:
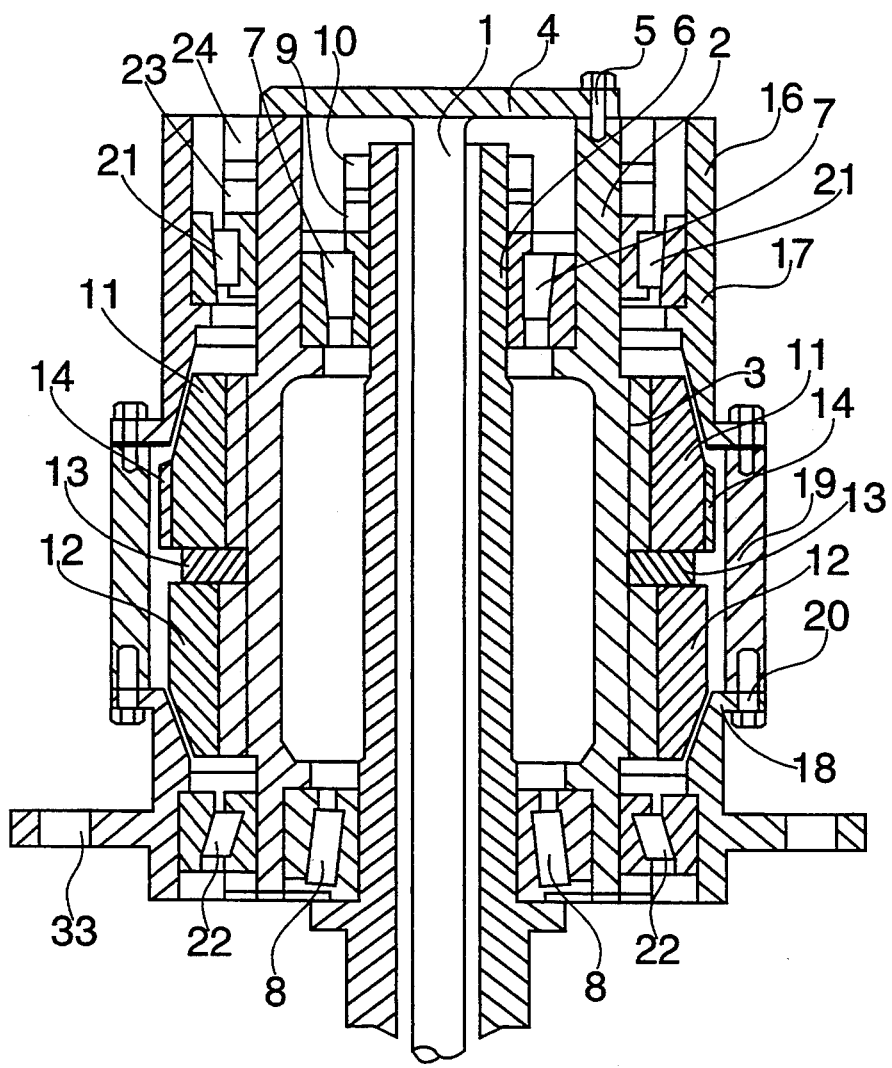
FIG. 1 is a schematic cross-sectional view of the preferred embodiment of the present invention.

The preferred embodiment is not intended to be exhaustive or to limit the invention to the precise form disclosed. For purposes of illustration, and not of limitation, the embodiment of the invention depicted in the drawings and described hereafter is placed in a Dong Feng series automobile. This is an automobile which is manufactured in the People's Republic of China. It has been chosen and is herein described in order to best explain the invention and its practical use to enable others skilled in the art to best utilize the invention. The coasting device may be applied to any vehicle or series of vehicles without departing from the scope of the invention and with minor modification by one who is skilled in the art.

Referring now to FIG. 1, drive hub 2 and half shaft 1 are rigidly connected by bolts 5 through flange 4. Provided between drive hub 2 and half shaft 1 is a shaft bushing 6, and provided between drive hub 2 and shaft bushing 6 are bearings 7 and 8. Bearing 7 is locked to shaft bushing 6 by nuts 9 and 10. External thread 3 is provided on the outside of drive hub 2, a rearward running ring 11 and a forward running ring 12 match with external thread 3 on drive hub 2, and the two rings 11 and 12 are spaced apart by retainer ring 13.

Provided on the outer circumference of rearward running ring 11 is a pair of brake shoes 14. Outer casing 16 is coaxially provided to surround the drive hub; provided on outer casing 16 are adjustable springs 15, which act against brake shoes 14. Spring 15 is provided inside a spring seat. A screw 34 is threaded onto the seat and contacts spring 15. The spring pressure is increased when screw 34 is turned in a clockwise direction, i.e., toward the inside, and is decreased when screw 34 is turned in a counter-clockwise direction, i.e., outwardly. By means of the pressure from springs 15, the brake shoes will grasp rearward running ring 11 (lockup state).

Outer casing 16 is assembled by a first cylinder 17, having an internal tapered surface corresponding to the tapered surface of rearward running ring 11, a second cylinder 18 having an internal tapered surface corresponding to the tapered surface of forward running ring 12, and a middle cylinder 19. The three cylinders are rigidly connected by bolts 20. Outer casing 16 is connected with the wheel rib and the brake hub (not shown) of the vehicle by bolts through holes 33.

Referring to FIGS. 2, 3 and 4, brake shoes 14 are mounted on the outer surface of rearward running ring 11 and will grasp rearward running ring 11 (lockup state) under the pressure from springs 15. The pressure from springs 15 is adjustable. Provided at the shoe tip of one brake shoe 14 is cam 25, which is mounted on one end of cam shaft 26; a pinion 27, engaged with a rack 28, is mounted on the other end of the cam shaft. Electromagnetic device 29 controls rack 8 to make it move reciprocally, thus rotating the cam to release or lock the brake shoes. Provided at the shoe tip of the other brake shoe is a cam 30, which is mounted on cam shaft 31. A centrifugal weight 32 is mounted on the other end of cam shaft 31. Under the action of the rotation of outer casing 16, the centrifugal weight moves outwardly; the movement of centrifugal weight 32 brings cam shaft 31 into rotation, thus making the other brake shoe release or close (lockup or free running). That is, only the other brake shoe 14 will be released or closed with the movement of centrifugal weight 32 under action of the rotation of outer casing 16.

When the power for forward running is transfered to drive hub 2 through half shaft 1, drive hub 2 rotates to bring forward running ring 12 into motion toward the internal tapered surface of second cylinder 18 along the thread until the tapered surface of ring 12 locks on the internal tapered surface of second cylinder 18. This action transfers the rotation to outer casing 16, thus making the wheels turn and causing the vehicle to run forward.

When the operator decreases or stops the supply of fuel (decelerates), the rotational speed of half shaft 1 is lower than that of outer casing 16. By virtue of the rotational inertia of outer casing 16, forward running ring 12 will retract back (that is, in the direction toward retainer ring 13) along the thread, thus drive hub 2 will start running free to fulfill the overrunning function of the overrunning clutch. When the speed of half shaft 1 increases once again, forward running ring 12 will be brought into motion toward the internal tapered surface of second cylinder 18 to repeat the afore-mentioned locking process.

While running in a rearward direction (backing) one brake shoe 14 will be closed through rack 28, pinion 27 and cam mechanism 25-26, under the activation of electromagnetic device 29, which will keep brake shoe 14 closed as long as the vehicle is running in the rearward direction. Half shaft 1 oppositely rotates to bring rearward running ring 11 into motion toward the internal tapered surface of first cylinder 17 until the tapered surface of ring 11 locks on the internal tapered surface to force outer casing 16 to rotate oppositely, thus accomplishing running in a rearward direction. There is no coasting in a rearward direction, because device 29 will keep brake shoe 14 locked while the vehicle is running in a rearward direction so as to bring the rearward running ring into a locking position on the internal tapered surface.

When it is desired to coast while forward running, brake shoes 14 at the outer circumference of rearward running ring 11 must be completely released. At this time, one brake shoe will be released through rack 28, pinion 27 and cam mechanism 25 and 26, under the activation of electro-magnetic device 29. The movement of electro-magnetic device 29 is controlled by the operator of the vehicle. The other brake shoe will be released under the action of centrifugal weight 32. In this way, the interference that outer casing 16 actuates on rearward running ring 11, causing movement of ring 11 toward the internal tapered surface of first cylinder 17, is prevented, and locking between the tapered surfaces will be avoided.

When coasting is not desired, because of rainy or snowy weather, or in hilly country, the pressure of springs 15 can be adjusted to cause the centrifugal force of centrifugal weight 32 to be lower than the pressure of springs 15, thus making brake shoes 14 tightly grasp rearward running ring 11. In this case, it is the same as if the coasting device had not been mounted, because the half shaft is locked into the forward running position (the tapered surface of forward running ring 12 presses against the corresponding tapered surface of cylinder 18) and travel safety is guaranteed.

When vehicles are provided with the coasting device of the present invention, the inertial energy, or, momentum, of the vehicles will be sufficiently utilized. Experimental data have shown that fuel can be saved by more than 25%, carbon monoxide emissions greatly reduced, mechanical wear significantly decreased and driver's labor eased.

From the preceding description of the preferred embodiment, it is evident that the objects of the invention are attained. Although the invention has been described and illustrated in detail, it is to be clearly understood that the same is intended by way of illustration and example only and is not to be taken by way of limitation. It is to be understood that various modifications may be adopted, and the spirit and scope of the invention are to be limited only by the terms of the appended claims.

What is claimed is:

1. A coasting device for a vehicle comprising: a half shaft, a drive hub with external thread, said hub coaxially mounted to one end of said half shaft; an overrunning clutch which includes a forward running ring and a rearward running ring, both said running rings matching said external thread and being of frustum shape with truncated conical surfaces, and the conical surfaces of said running rings being oppositely disposed, and said running rings being threaded on the threaded section of said drive hub; a retainer ring provided between the two running rings; an outer casing coaxially provided outside the drive hub, with an annular chamber formed therein, said chamber being provided with conical shaped surfaces to match said conical surfaces of said running rings; and a locking device provided outside the rearward running ring; said outer casing comprising a first cylinder with an internal conical surface; a second cylinder with an internal conical surface; a middle cylinder provided between the first and second cylinders and rigidly connected with them; thus forming a chamber with internal conical surfaces at each end and a cylindrical internal surface in the middle, said locking device further comprising a pair of brake shoes provided radially inside said middle cylinder; and a spring device provided radially outside the brake shoes, urging the brake shoes against the rearward running ring to achieve a lockup state, by virtue of the pressure exerted by said spring device, said locking device further comprising a pair of brake shoes having shoe tips and a first cam mechanism having a cam, a cam shaft and an electromagnetic drive device, said cam being provided at the position of the shoe tip of one brake shoe and being rotatable to release the brake shoe under the operation of said electromagnetic device.

2. The coasting device for a vehicle described in claim 1, further comprising a second cam mechanism having a second cam, a second cam shaft and a centrifugal weight, said second cam being provided at the position of the shoe tip of the other brake shoe and being mounted on the second cam shaft, and the centrifugal weight being mounted on the other end of the second cam shaft; the movement of the centrifugal weight urging the second cam shaft into rotation to release said other brake shoe.

* * * * *